(12) United States Patent
Safai et al.

(10) Patent No.: US 9,234,740 B1
(45) Date of Patent: Jan. 12, 2016

(54) SHEAROGRAPHIC INSPECTION SYSTEM USING A LASER MATRIX

(75) Inventors: Morteza Safai, Newcastle, WA (US); Kimberly D. Meredith, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 381 days.

(21) Appl. No.: 13/593,008

(22) Filed: Aug. 23, 2012

(51) Int. Cl.
*G01B 9/02* (2006.01)

(52) U.S. Cl.
CPC ........ *G01B 9/02098* (2013.01); *G01B 9/02096* (2013.01)

(58) Field of Classification Search
CPC ............. G01B 9/02096; G01B 11/162; G01B 9/02095; G01B 9/02094; G01B 9/02032
USPC .................................................. 356/520, 512
See application file for complete search history.

(56) References Cited

U.S. PATENT DOCUMENTS

| | | | |
|---|---|---|---|
| 5,870,191 A * | 2/1999 | Shirley et al. ................. | 356/511 |
| 6,879,427 B2 * | 4/2005 | Mendlovic et al. ........... | 359/279 |

OTHER PUBLICATIONS

Bova et al., "Low-cost speckle interferometry for measuring 3D deformation fields: Hardware and software," Optics and Lasers in Engineering, vol. 48, Issue 1, Jan. 2010, pp. 96-106.
Khajavikhan et al., "Thresholdless nanoscale coaxial lasers," Nature, vol. 482, Feb. 2012, pp. 204-207.
Spagnolo et al., "ESPI: A Tutorial," EETimes Design, Jun. 2001, 5 Pages, accessed Jun. 27, 2012 http://www.eetimes.com/design/embedded/4017984/ESPI-A-Tutorial.
Viotti et al., "Industrial Inspections by Speckle Interferometry: General Requirements and a Case Study," Proceedings of SPIE, vol. 7389, Jun. 2009, 15 Pages.
Khajavikhan et al., "Thresholdless nanoscale coaxial lasers," Supplementary Information, Nature, vol. 482, Feb. 2012, 29 Pages, accessed Mar. 28, 2012 http://www.nature.com/nature/journal/v482/n7384/extref/nature10840-s1.pdf.

* cited by examiner

Primary Examiner — Hwa Lee
(74) Attorney, Agent, or Firm — Yee & Associates, P.C.

(57) ABSTRACT

A method and apparatus for inspection of an object. The apparatus comprises an array of light sources and a support structure. The array of light sources is configured to generate beams of coherent light with a substantially uniform distribution of the beams of coherent light in an area on a surface of an object in the area that results in a number of speckle patterns in light reflected from the surface of the object in the area in response to the beams of coherent light in the area. The support structure is associated with the array of light sources.

13 Claims, 14 Drawing Sheets

SHEAROGRAPHIC INSPECTION SYSTEM USING A LASER MATRIX

BACKGROUND INFORMATION

1. Field

The present disclosure relates generally to inspecting objects and, in particular, to inspecting objects using interferometry systems. Still more particularly, the present disclosure relates to inspecting objects using laser interferometry inspection systems.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Using composite materials to create aerospace composite structures may allow for portions of an aircraft to be manufactured in larger pieces or sections. For example, a fuselage in an aircraft may be created in cylindrical sections to form the fuselage of the aircraft. Other examples include, without limitation, wing sections joined to form a wing or stabilizer sections joined to form a stabilizer.

In manufacturing composite structures, layers of composite material may be laid up on a tool. The layers of composite material may be comprised of fibers in sheets. These sheets may take the form of, for example, without limitation, fabrics, tape, tows, or some other suitable configuration for the sheets. In some cases, resin may be infused or pre-impregnated into the sheets. These types of sheets are commonly referred to as prepreg.

The different layers of prepreg may be laid up in different orientations and different numbers of layers may be used depending on the desired thickness of the composite structure being manufactured. These layers may be laid up by hand or using automated lamination equipment such as a tape laminating machine or a fiber placement system.

After the different layers of composite material have been laid up on the tool, the layers of composite material may be consolidated and cured upon exposure to temperature and pressure, thus forming the final composite structure. Thereafter, the composite structure may be inspected to determine whether inconsistencies are present.

This inspection may be performed using ultrasound testing, eddy current testing, x-ray testing, visual inspections, and other suitable types of testing. In particular, this type of testing results in nondestructive inspection of the object.

This testing may be performed to identify various inconsistencies in the composite structure. For example, without limitation, inconsistencies may include delamination, voids, undesired levels of porosity, foreign object debris, and other types of inconsistencies.

If an inconsistency is identified, the composite structure may be reworked. In some cases, the inconsistency may result in the composite structure being discarded, thus requiring a new composite structure to be manufactured.

One type of nondestructive inspection system is a speckle shearing interferometry inspection system. A speckle shearing interferometry inspection system may be called a shearographic inspection system and may be used to perform inspections for inconsistencies in a composite structure.

This type of inspection system employs shearography, which is an optical inspection technique that measures out of plane displacement in the surface of the composite structure. For example, air entrapped in a disbonded portion of a composite structure may cause a change in the surface of the composite structure. This out of plane displacement may be used to determine the mechanical strain of the composite structure under test.

A shearographic inspection system is configured to detect these types of changes and uses a laser unit as a light source to generate coherent light in the form of a laser beam. The laser beam illuminates the surface of the composite structure. The light from the laser beam may result in a pattern of light being reflected from the surface of the composite structure. This pattern of light is caused by different features on the surface of the composite structure.

Movement is generated in the surface of the composite structure. When an inconsistency is present in the layers of composite material under the surface of the composite structure, movement of the surface of the composite structure may not be uniform. As a result, an identifiable change in the pattern of light reflected from the surface of the composite structure may be detected.

Images of the patterns of light may be generated. The images of these patterns of light may be analyzed to determine whether an inconsistency is present in the composite structure.

Although a shearographic inspection system is useful in identifying inconsistencies in a composite structure, currently available shearographic inspection systems may be more limited in application than desired. The size and complexity of shearographic inspection systems may limit the situations in which this type of inspection system may be used.

Therefore, it would be desirable to have a method and apparatus that takes into account at least some of the issues discussed above, as well as other possible issues.

SUMMARY

In one illustrative embodiment, an apparatus comprises an array of light sources and a support structure. The array of light sources is configured to generate beams of coherent light with a substantially uniform distribution of the beams of coherent light in an area on a surface of an object in the area that results in a number of speckle patterns in light reflected from the surface of the object in the area in response to the beams of coherent light in the area. The support structure is associated with the array of light sources.

In another illustrative embodiment, a shearographic inspection system comprises an array of light sources, a support structure, and a camera system. The array of light sources is configured to generate beams of coherent light with a substantially uniform distribution of the beams of coherent light in an area on a surface of an object that results in a number of speckle patterns in light reflected from the surface of the object in the area in response to the beams of coherent light in the area. The support structure is associated with the array of light sources. The system is configured to generate images of the area in which the number of speckle patterns in the light reflected from the surface of the object caused by the beams of coherent light are present in the images.

In yet another illustrative embodiment, a method for inspecting an object is provided. Beams of coherent light are sent into an area on a surface of an object from an array of light sources. The beams of coherent light have a substantially uniform distribution in the area on the surface of the object. Images are generated from light reflected from the surface of the object in the area in response to the beams of coherent light in the area. A number of speckle patterns are present in the images. A determination is made as to whether an inconsistency is present using the images.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
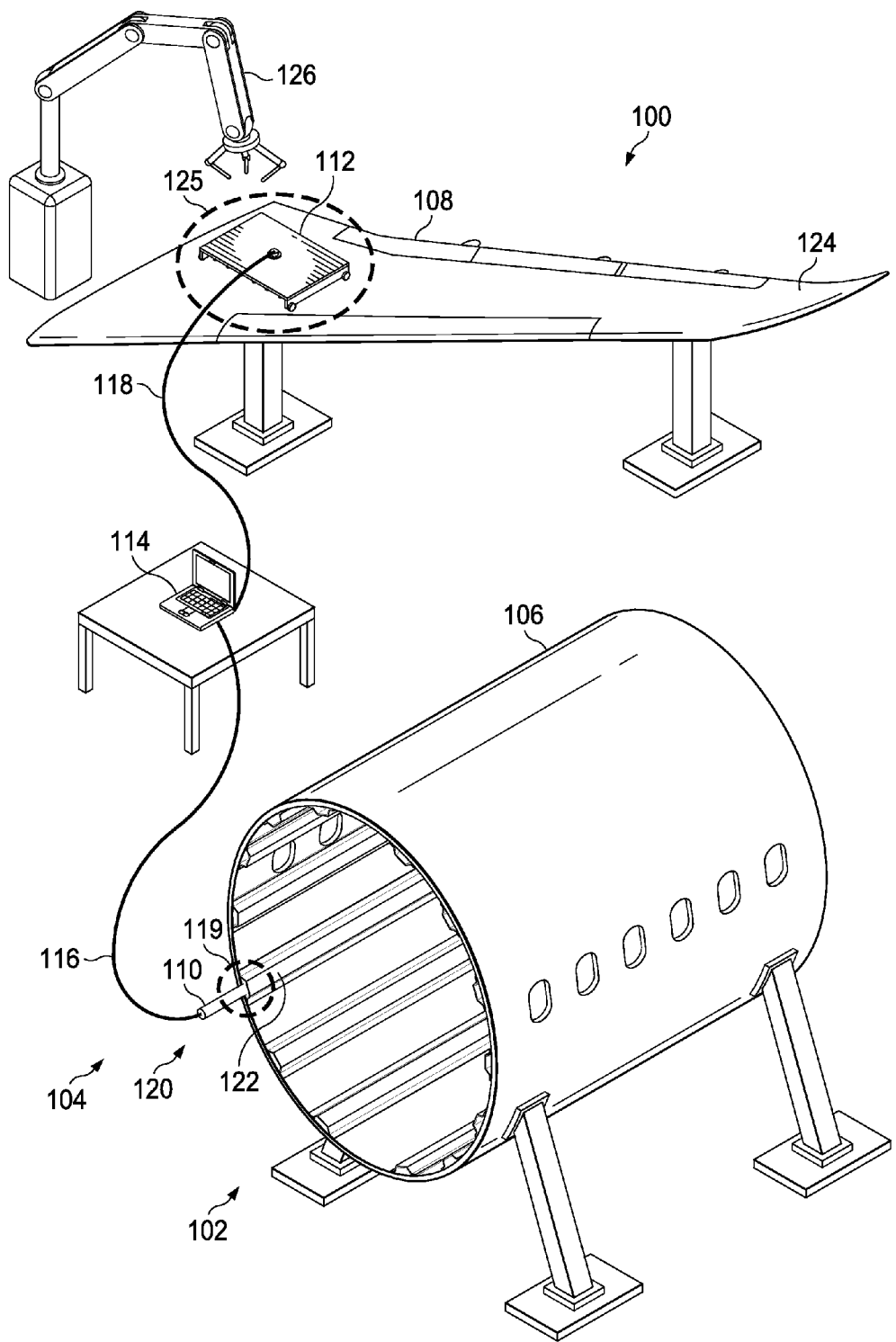
FIG. 1 is an illustration of an inspection environment in accordance with an illustrative embodiment.

The illustrative embodiments recognize and take into account one or more different considerations. For example, the illustrative embodiments recognize and take into account that one of the difficulties in using a shearographic inspection system is the offset that is needed for currently available shearographic inspection systems. The different illustrative embodiments recognize and take into account that the size and design of currently used laser units may result in a longer than desired offset between the laser in the shearographic inspection system and the surface of the object being inspected.

The illustrative embodiments also recognize and take into account that the size of this offset may limit the use of these types of inspection systems. For example, currently available shearographic inspection systems may be unable to perform inspections of objects with surfaces that have limited access. For example, inspection of the surfaces inside of a fuel tank, a stringer, or other types of structures may be difficult to inspect with currently available shearographic inspection systems.

In particular, the illustrative embodiments recognize and take into account that the length of the offset may make positioning the laser relative to the surface to be inspected infeasible for surfaces with limited access. In some cases, the structure may be disassembled to provide access to the surface. For example, in some situations, the interior of a wing, such as a cavity or fuel tank, may be accessed by disassembling the wing. This disassembly may require more time and effort than desired. In other situations, this disassembly may be infeasible.

Thus, the illustrative embodiments provide a method and apparatus for inspecting an object. In one illustrative embodiment, an apparatus comprises an array of light sources and a support structure. The array of light sources is configured to generate beams of coherent light with a substantially uniform distribution of the beams of coherent light in an area on the surface of the object. The substantially uniform distribution results in a number of speckle patterns in light reflected from the surface of the object in the area in response to the beams of coherent light directed to the area. The support structure is associated with the array of light sources and provides a framework to hold the array of light sources.

When one component is "associated" with another component, the association is a physical association in the depicted examples. For example, a first component, a support structure, may be considered to be associated with a second component, an array of light sources, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

With the use of an array of light sources, a desired area may be covered by the beams of coherent light with a substantially uniform direct distribution and a smaller offset than is possible with a single beam configured to illuminate the same area.

With reference now to the figures and, in particular, with reference to FIG. 1, an illustration of an inspection environment is depicted in accordance with an illustrative embodiment. In this depicted example, aircraft parts 102 may be inspected by shearographic inspection system 104 in inspection environment 100. In this illustrative example, aircraft parts 102 include fuselage section 106 and wing 108.

As depicted, shearographic inspection system 104 is a nondestructive inspection system that employs speckle shearing interferometry techniques.

Shearographic inspection system 104 includes inspection unit 110 and inspection unit 112. Inspection unit 110 and inspection unit 112 are in communication with computer 114 through communications link 116 and communications link 118, respectively. Communications link 116 and communications link 118 may take the form of wires, optical fibers, or other suitable types of media.

As depicted, inspection unit 110 shown in section 119 may perform inspections in interior 120 of stringer 122 in fuselage section 106. In this illustrative example, inspection unit 110 may be a mobile inspection unit having a movement system configured to move inspection unit 110 into interior 120 of stringer 122 in fuselage section 106.

Inspection unit 112 is positioned on surface 124 of wing 108 as depicted in section 125. As depicted, inspection unit 112 may be positioned over different portions of surface 124 of wing 108 by robotic arm 126.

The illustration of inspection environment 100 in FIG. 1 is not meant to imply limitations to the manner in which other inspection environments may be implemented. For example, only a single inspection unit may be present or one or more additional inspection units may be present in inspection environment 100.

Further, these other inspection units may be controlled by computer 114 or other computers in inspection environment 100. Additionally, aircraft parts 102 may include other parts other than fuselage section 106 and wing 108. For example, without limitation, aircraft parts 102 also may include a horizontal stabilizer, a vertical stabilizer, a flap, a spoiler, or some other suitable part. Further, the inspection of aircraft parts 102 may occur on an aircraft that is fully assembled rather than disassembled as depicted in inspection environment 100.

Figure 2:
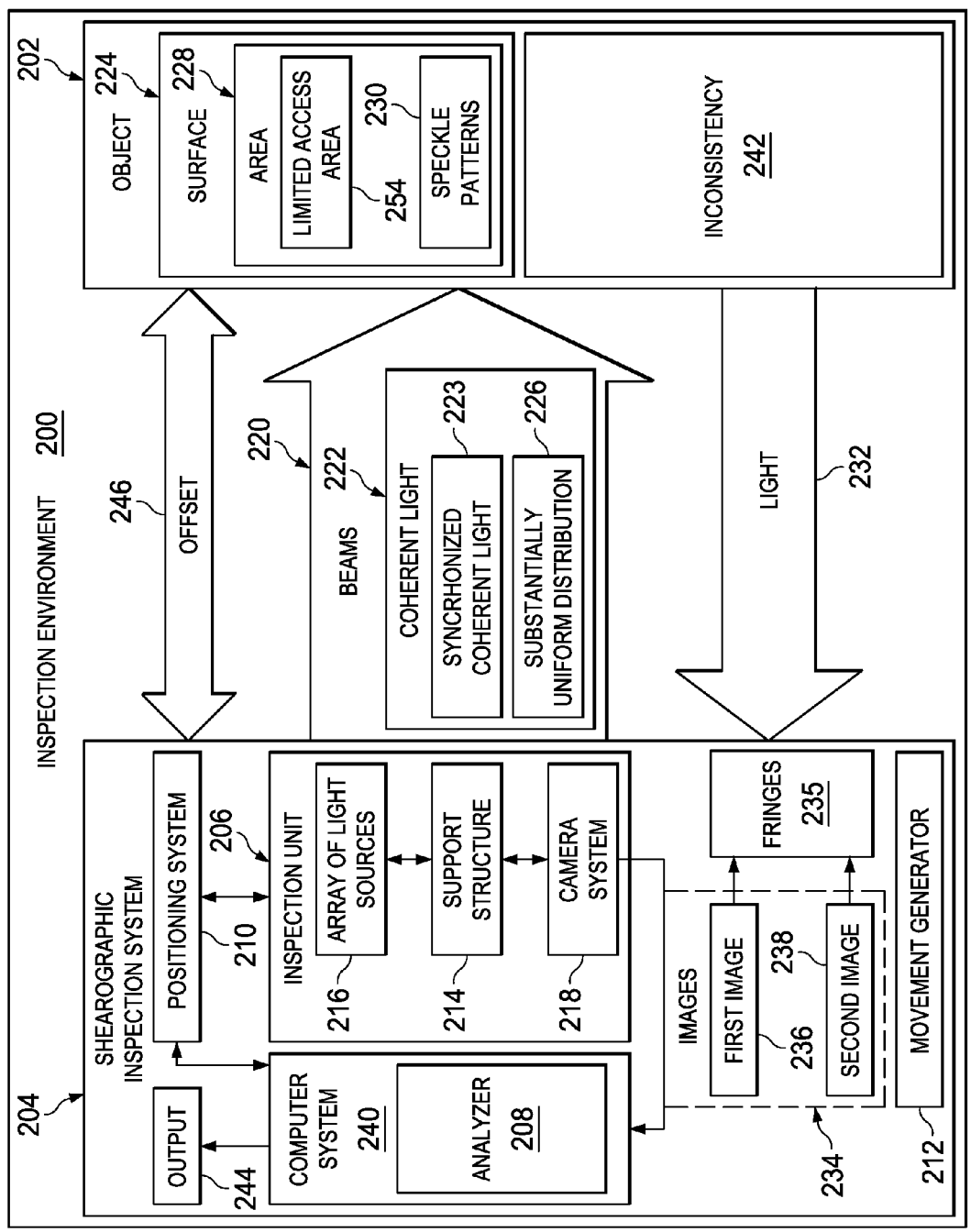
FIG. 2 is an illustration of a block diagram of an inspection environment in accordance with an illustrative embodiment.

With reference now to FIG. 2, an illustration of a block diagram of an inspection environment is depicted in accordance with an illustrative embodiment. Inspection environment 100 in FIG. 1 is an example of one implementation for inspection environment 200 shown in block form in this figure.

In this illustrative example, object 202 may be inspected using shearographic inspection system 204. As depicted, shearographic inspection system 204 includes inspection unit 206, analyzer 208, positioning system 210, and movement generator 212. Of course, other components may be included within shearographic inspection system 204 in addition to or in place of the ones depicted in this illustrative example.

As depicted, inspection unit 206 comprises support structure 214, array of light sources 216, and camera system 218. Support structure 214 may be any structure configured to be associated with other components in inspection unit 206. In this illustrative example, support structure 214 is associated with array of light sources 216 and camera system 218.

As depicted, support structure 214 may take various forms. For example, without limitation, support structure 214 may be a frame, a housing, or may take some other suitable form. In some illustrative examples, support structure 214 may be composed of more than one substructure.

As illustrated, array of light sources 216 is configured to generate beams 220 of coherent light 222 that may be directed to surface 224 of object 202. Coherent light 222 is synchronized coherent light 223 in these illustrative examples. Synchronized coherent light 223 in beams 220 is light that is generated at substantially the same time.

For example, all beams in synchronized coherent light 223 are generated at substantially the same time and have substantially the same properties. As a result, beams 220 of synchronized coherent light 223 from array of light sources 216 may reach surface 224 of object 202 at substantially the same time in these illustrative examples. The properties may include at least one of amplitude, phase, frequency and other properties of coherent light 222.

As depicted, array of light sources 216 may take a number of different forms. For example, array of light sources 216 may include at least one of a laser, a light-emitting diode, or some other suitable type of light source. For example, multiple gas lasers may be used for array of light sources 216 if those gas lasers operate to generate beams 220 of synchronized coherent light 223.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

In these illustrative examples, coherent light 222 in beams 220 has light waves of substantially the same frequency and substantially the same phases. In particular, the waves of coherent light 222 in beams 220 may have a constant relative phase to each other with substantially the same frequency.

In this illustrative example, array of light sources 216 is configured to generate beams 220 of coherent light 222 with substantially uniform distribution 226 of coherent light 222 in area 228 on surface 224 of object 202.

Beams 220 of coherent light 222 result in a number of speckle patterns 230 on surface 224 of object 202 in area 228 generated in response to beams 220 of coherent light 222 in area 228. As used herein, a "number of" when used with reference to items means one or more items. For example, a number of speckle patterns 230 is one or more speckle patterns.

Speckle patterns 230 can be detected in light 232 reflected from surface 224 of object 202. A speckle pattern in the number of speckle patterns 230 is a pattern of intensity of coherent light 222 on surface 224 in area 228.

A speckle pattern is a result of an interference of waves of coherent light 222 having the same frequency but different phases and amplitudes. These waves, when added together, may result in a wave with an amplitude that varies randomly. This amplitude corresponds to the intensity of coherent light 222, resulting in the number of speckle patterns 230.

In these illustrative examples, camera system 218 is configured to generate images 234 from detecting light 232. As depicted, camera system 218 may be a shearing camera system. This shearing camera system is a camera system that focuses two laterally sheared images at a film plane or an electronics imaging plane. In these illustrative examples, camera system 218 may generate images 234 to measure the displacement of surface 224 of object 202.

As depicted, camera system 218 may be comprised of one or more cameras. These cameras may be the same type or different types of cameras. For example, camera system 218 may include at least one of a visible light camera, an infrared camera, and other suitable types of cameras. Images 234 generated by camera system 218 may include a number of speckle patterns 230. The number of speckle patterns 230 may be displayed as fringes 235 in images 234.

In these illustrative examples, images 234 are generated by camera system 218 before and after movement of surface 224.

As depicted, movement generator 212 is configured to cause movement of surface 224. Movement generator 212 may be implemented using any mechanism configured to cause movement of surface 224 of object 202. In particular, movement generator 212 may be any device configured to generate movement of surface 224 in area 228 of at least a quarter of a wavelength of beams 220 of coherent light 222. Generally, surface 224 will return to its original position after movement of surface 224.

Movement generator 212 may be selected from at least one of a biasing member, a heating element, a vacuum generator, a laser, and some other suitable type of devices. A biasing member may apply force to object 202 in a manner that causes movement of surface 224. A heating element, such as a heater or oven, may cause object 202 to expand in a manner that causes movement of surface 224. A vacuum generator may apply pressure to surface 224 of object 202 to cause the desired movement. A laser may generate vibrations in object 202 to cause movement of surface 224.

Camera system 218 may generate first image 236 prior to movement of surface 224 in area 228. First image 236 may be used as a reference image for analyzer 208 in detecting inconsistencies in surface 224 of object 202 in these illustrative examples. Camera system 218 may then generate second image 238 after movement of surface 224 in area 228.

In this example, second image 238 is then compared to first image 236 by analyzer 208. The comparison of first image 236 and second image 238 may result in a display of fringes 235.

As depicted, fringes 235 may be indications of constructive and destructive interference in the light detected by camera system 218. Fringes 235 may take the form of light and dark portions of images 234 as displayed on a display device. Analyzer 208 may use fringes 235 to calculate the out of plane displacement of surface 224 of object 202.

In this illustrative example, analyzer 208 is configured to control the operation of shearographic inspection system 204 and process information generated by shearographic inspection system 204. As depicted, analyzer 208 may take the form of hardware, software, or a combination of the two. When software is used, the operations performed by analyzer 208 may be implemented in program code configured to run on a processor unit. When hardware is employed, the hardware may include circuits that operate to perform the operations in analyzer 208.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, analyzer 208 may be implemented in computer system 240. Computer system 240 may comprise one or more computers. When more than one computer is present, those computers may be in communication with each other via a communications medium such as a network.

In this illustrative example, analyzer 208 is configured to control the operation of the other components such as inspection unit 206, positioning system 210, and movement generator 212. For example, analyzer 208 may send commands to positioning system 210 to move inspection unit 206 to different areas on surface 224 of object 202. Additionally, analyzer 208 may cause array of light sources 216 to generate beams 220 of coherent light 222 and cause camera system 218 to generate images 234 for processing by analyzer 208.

In these illustrative examples, analyzer 208 is configured to analyze images 234 to determine whether inconsistency 242 is present in object 202. For example, analyzer 208 may compare first image 236 to second image 238 to determine whether inconsistency 242 is present in object 202.

Inconsistency 242 is an undesired property in object 202. Inconsistency 242 may be, for example, at least one of disbonding, an undesired level of porosity, delamination, corrosion, or some other undesired property.

With corrosion, for example, the structure of object 202 may be weakened. In this case, shearographic inspection system 204 may detect out of plane surface displacement due to this type of inconsistency. In other words, if inconsistency 242 causes out of plane surface displacement of surface 224 of object 202, shearographic inspection system 204 may be used to detect inconsistency 242 in these illustrative examples.

In response to analyzing images 234, analyzer 208 may generate output 244. Output 244 may take various forms such as an alert, a report, images 234, and other suitable types of output. Output 244 may be generated as inspection unit 206 generates images 234 and analyzer 208 analyzes images 234 with positioning system 210 moving inspection unit 206 over different areas of surface 224 of object 202. In other illustrative examples, output 244 may be performed after the inspection of all of the desired areas of surface 224 using inspection unit 206.

In these illustrative examples, inspection unit 206 is configured to allow for inspection of object 202 in various forms. In particular, inspection unit 206 may be suited for inspecting object 202 when area 228 for object 202 takes the form of limited access area 254.

In these illustrative examples, array of light sources 216 in inspection unit 206 is selected to have a desired value for offset 246 that provides for substantially uniform distribution 226 of coherent light 222 in beams 220 of coherent light 222 when beams 220 of coherent light 222 reach surface 224 of object 202.

Offset 246 may be a desired offset in these illustrative examples. Offset 246 may be the shortest distance that provides illumination of surface 224 of object 202 in area 228 such that a uniform distribution is obtained. Further, offset 246 provides illumination of surface 224 of object 202 in area 228 such that array of light sources 216 with beams 220 of synchronized coherent light 223 maintains desired parameters without affecting the field of view of camera system 218.

Offset 246 is shorter for area 228 as compared to the offset used by a single laser to cover area 228 with a desired level of distribution of coherent light on area 228. In other words, array of light sources 216 may provide substantially uniform distribution 226 of coherent light 222 in area 228 as compared to a single laser covering area 228.

Having offset 246 smaller than an offset for other currently available inspection units provides an advantage for some types of inspections. For example, in some inspections of object 202, limited access area 254 may be present.

In these illustrative examples, limited access area 254 may require offset 246 to be smaller than possible with currently used shearographic inspection systems. As depicted, inspection unit 206 may be configured to have offset 246 that allows access to surface 224 of object 202 when area 228 takes the form of limited access area 254. This limited access is access that makes using currently available lasers for this type of inspection infeasible.

Limited access area 254 may be, for example, selected from one of an interior of a stringer, an interior of a fuel tank, a landing gear area, and other areas in which access may be limited or reduced as compared to an exterior surface such as a wing or fuselage of an aircraft.

In other words, with the size and complexity of currently used inspection systems, inspecting the interior of these structures using a currently available shearographic inspection system may be infeasible or may require disassembly of object 202. Disassembly of object 202 may be more costly or difficult than desired. For example, currently available shearographic inspection systems may not have a desired level for offset 246. However, these structures may be inspected with shearographic inspection system 204 because offset 246 may be adjusted to a desired offset in these illustrative examples.

The illustration of inspection environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, inspection unit 206 may include one or more additional arrays of light sources in addition to array of light sources 216. Further, camera system 218 may be located in a separate location from support structure 214 in inspection unit 206. In other words, camera system 218 may be a separate component from inspection unit 206 or may be in a separate physical location from other components in inspection unit 206.

As another example, positioning system 210 may be implemented as part of inspection unit 206 in some illustrative embodiments. For example, positioning system 210 may be a motorized track or motorized wheels that are associated with support structure 214. In other words, positioning system 210 may be integrated as part of support structure 214 in inspection unit 206.

Additionally, although the illustrative embodiments have been described with respect to structures for aircraft, such as aircraft parts 102, the different illustrative embodiments may be applied to other types of platforms and parts for platforms other than those for aircraft. For example, the illustrative embodiments may be applied to platforms or parts for platforms selected from a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 3:
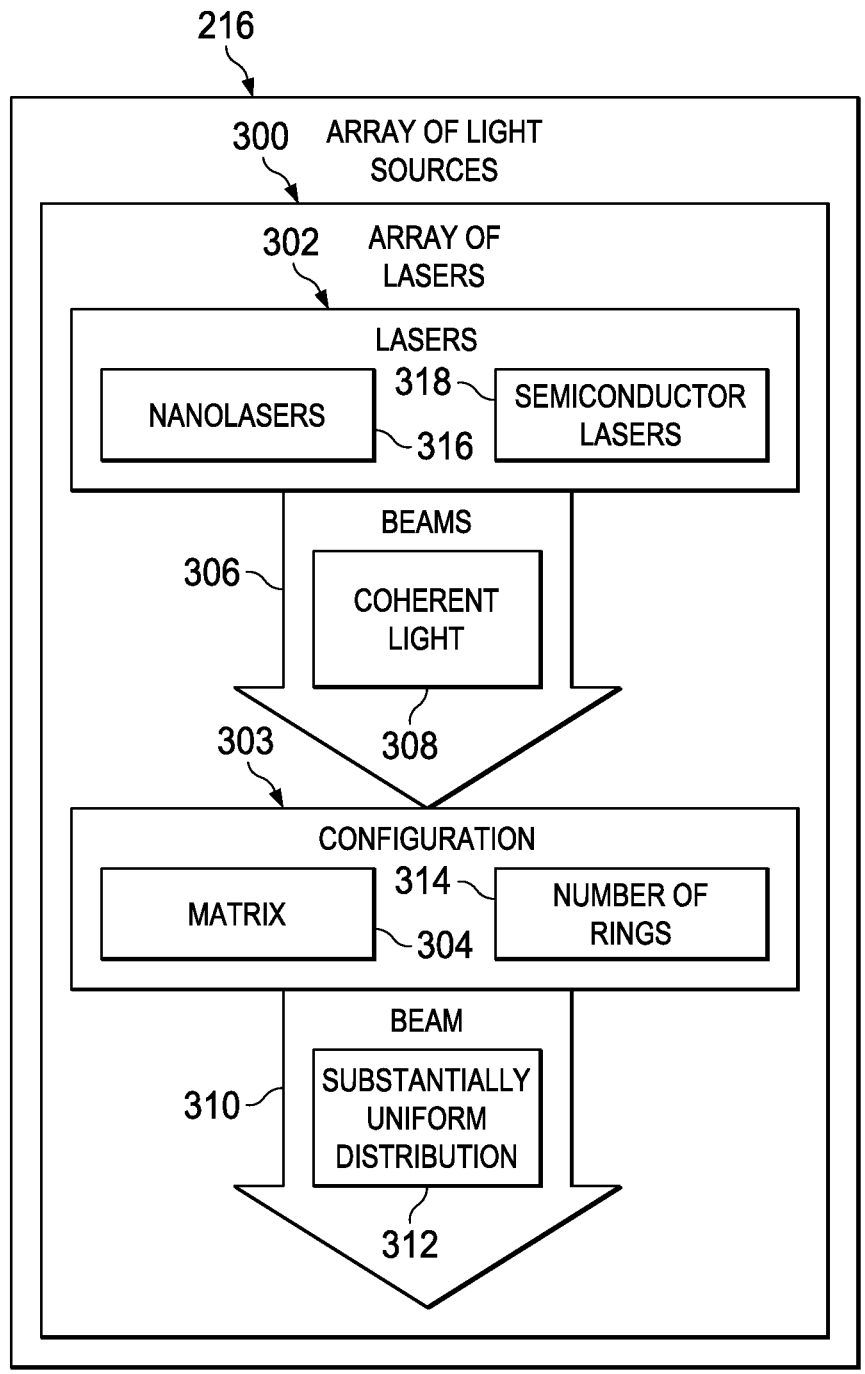
FIG. 3 is an illustration of a block diagram of an array of light sources in accordance with an illustrative embodiment.

Turning now to FIG. 3, an illustration of a block diagram of an array of light sources is depicted in accordance with an illustrative embodiment. In this depicted example, array of light sources 216 is implemented using array of lasers 300.

As depicted, array of lasers 300 is comprised of lasers 302. Lasers 302 are all substantially the same. In other words, each laser in lasers 302 may have substantially the same characteristics when generating coherent light 308 as with other lasers in lasers 302.

In these illustrative examples, lasers 302 in array of lasers 300 have configuration 303. For example, configuration 303 of lasers 302 in array of lasers 300 may take the form of matrix 304. In other words, lasers 302 may be arranged in rows and columns in which the different lasers in lasers 302 are equally spaced with respect to each other.

Matrix 304 is designed such that beams 306 of coherent light 308 generated by lasers 302 form beam 310 such that beam 310 generates substantially uniform distribution 312 of coherent light 308 on the surface of object 202 in FIG. 2.

In another illustrative example, configuration 303 for lasers 302 may take the form of number of rings 314. When lasers 302 are arranged in number of rings 314, lasers 302 may point outward or inward with respect to number of rings 314. Number of rings 314 may be especially suited for inspection of surfaces of a channel in object 202.

By using lasers 302 instead of a single laser, offset 246 for lasers 302 may be shallower or lower in value than that of a single laser generating a beam of light that covers area 228 in FIG. 2.

In this illustrative example, lasers 302 may take the form of nanolasers 316. A nanolaser may also be referred to as a miniature laser or a plasmonic laser. A nanolaser may have dimensions on a nanoscale level. Nanolasers 316 may be an array of nanolasers 316.

In these illustrative examples, lasers of this size may be implemented as semiconductor lasers 318. Semiconductor lasers 318 may take various forms. For example, semiconductor lasers 318 may take various forms such as a laser diode.

By manufacturing lasers 302 using semiconductor processes, each laser in lasers 302 may be made substantially the same as other lasers in lasers 302. In this manner, lasers 302 may all generate coherent light 308 in beams 306 having substantially the same characteristics as other lasers in lasers 302.

Figure 4:
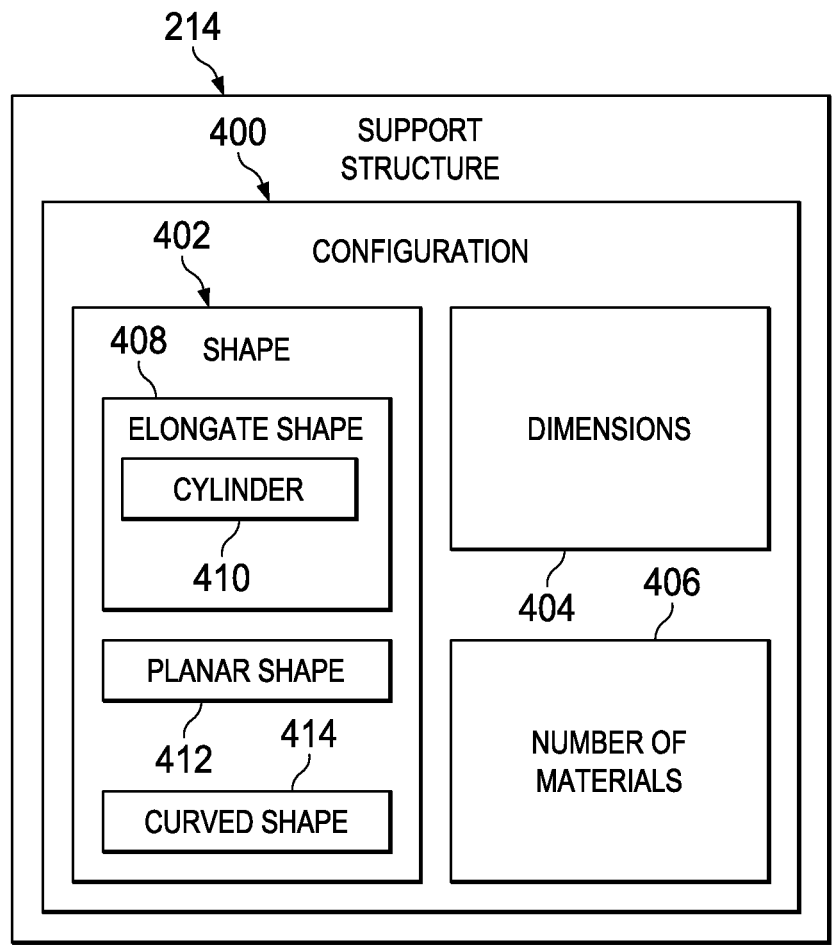
FIG. 4 is an illustration of a block diagram of a support structure in accordance with an illustrative embodiment.

Turning now to FIG. 4, an illustration of a block diagram of a support structure is depicted in accordance with an illustrative embodiment. In this illustrative example, support structure 214 has configuration 400. Configuration 400 includes shape 402, dimensions 404, and number of materials 406.

In this illustrative example, shape 402 and dimensions 404 may be selected such that support structure 214 with array of light sources 216 may be placed into a limited access area such as limited access area 254.

In another illustrative example, shape 402 may be elongate shape 408. Further, shape 402 may be cylinder 410. Cylinder 410 may have dimensions 404 that allow support structure 214 with array of light sources 216 to be placed into an interior of a stringer or a fuel tank. For example, shape 402 may be planar shape 412. Planar shape 412 may be used on object 202 when object 202 is an object such as a wing, a floor, and other suitable objects.

In other illustrative examples, shape 402 may be curved shape 414. Curved shape 414 may be used on object 202 when object 202 is an object such as a fuselage section, an engine housing, or other suitable objects with curved surfaces.

Dimensions 404 may be selected based on potential objects that may be inspected using inspection unit 206. In these illustrative examples, support structure 214 may be configured to be scalable such that dimensions 404 may be changed for different applications. For example, other structures may be added to support structure 214 to increase the size of support structure 214 in dimensions 404, such as length and width. Further, portions of support structure 214 may also be removed to reduce length, width, or both in dimensions 404.

Support structure 214 may be comprised of number of materials 406. Number of materials 406 may be selected based on desired performance parameters such as weight, load capability, and other suitable parameters. For example, number of materials 406 may be selected from at least one of a composite material, a metal, a plastic, aluminum, polycarbonate, polyvinylchloride, and other suitable materials.

The illustration of configuration 400 for support structure 214 is presented only as an example of some possible configurations for support structure 214. Other shapes may be used for shape 402 other than those illustrated in these depicted examples.

Further, shape 402 of support structure 214 may change from one inspection to another inspection. For example, support structure 214 may be configured to have planar shape 412 during one inspection and curved shape 414 in a subsequent inspection. As a result, shearographic inspection system 204 with support structure 214 may be used to inspect a variety of surfaces within an aircraft or other structure.

Figure 5:
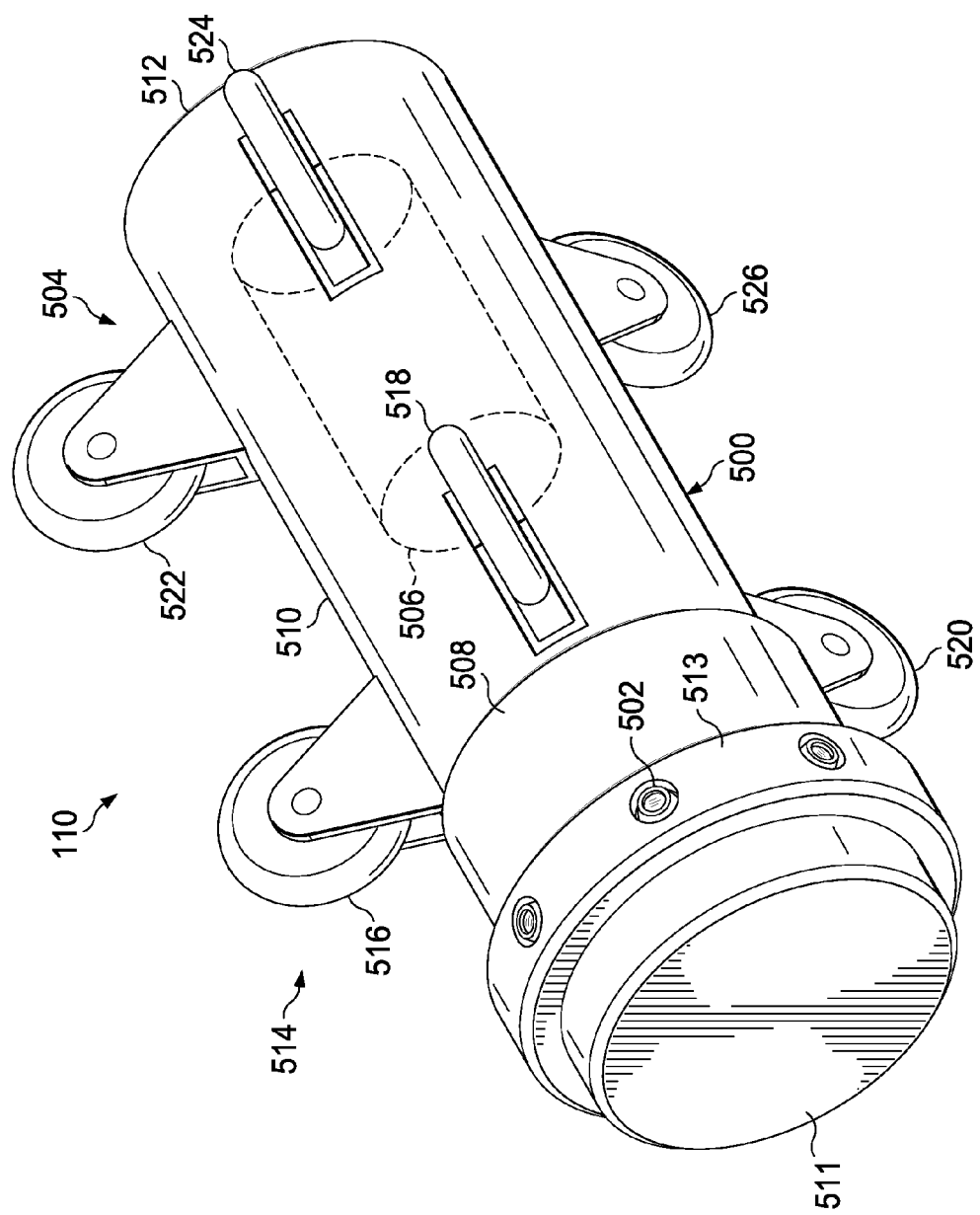
FIG. 5 is an illustration of an inspection unit in accordance with an illustrative embodiment.

Turning now to FIG. 5, an illustration of an inspection unit is depicted in accordance with an illustrative embodiment. In this depicted example, a perspective view of inspection unit 110 in FIG. 1 is shown. Inspection unit 110 is an example of a physical implementation of inspection unit 206 shown in block form in FIG. 2.

As depicted, inspection unit 110 includes support structure 500, array of lasers 502, positioning system 504, camera system 506, and optics 508. In this illustrative example, camera system 506 is located within support structure 500 and is shown in phantom.

Support structure 500 takes the form of an elongate member. In particular, support structure 500 takes the form of cylinder 510. As depicted, cylinder 510 has end 511 and end 512. In other words, support structure 500 has a cross section that is a circular shape in these illustrative examples. Thus, support structure 500 has a shape and dimensions configured for placement into interior 120 of stringer 122 in FIG. 1.

As depicted, array of lasers 502 is located on ring 513 which is connected to cylinder 510. In this illustrative example, array of lasers 502 is implemented using nanolasers. As depicted, array of lasers 502 may have an offset that is shorter than offsets used by a single laser. Thus, the configuration of array of lasers 502 on ring 513 may be especially suited for inspection of interior walls in a channel through a structure such as a stringer, a pipe, a duct, or other similar structure.

Moreover, array of lasers 502 on ring 513 may be particularly useful in generating uniform distribution of beams 220 of coherent light 222 in FIG. 2. Array of lasers 502 on ring 513 may be used for large parts or large spaces where currently used inspection systems do not provide a desired level of uniform distribution of coherent light.

Optics 508 provide camera system 506 with an ability to generate images from light generated by array of lasers 502. In this illustrative example, optics 508 may be at least one of a lens, a mirror, and some other suitable type of optic.

As depicted, optics 508 may be shearing optics configured to allow for the generation of images 234 for out of plane displacement of object 202 in FIG. 2. Out of plane displacement may also be identified as rise over run, or slope. If an inconsistency is present in object 202, out of plane displacement, or a slope change, may be present. This out of plane displacement or slope change is used to determine the mechanical strain on object 202.

When optics 508 are shearing optics, camera system 506 shears, or splits, coherent light 222 into two object beams. These object beams hit the surface of object 202 at slightly different locations on surface 224 of object 202. These two object beams create a double image of surface 224 of object 202. When light 232 is reflected back to camera system 506, the configuration of optics 508 superimposes these two object beams to form first image 236 in FIG. 2 as an output.

In these illustrative examples, as movement generator 212 moves object 202, the distance traveled by the object beams changes. This change may be a phase change. This phase change is measured by camera system 506, in the same manner as first image 236, to produce second image 238 in FIG. 2 as an output. First image 236 and second image 238 are then compared to each other to determine the displacement of surface 224 of object 202.

In this illustrative example, positioning system 504 takes the form of motorized wheels 514. In particular, motorized wheels 514 include motorized wheel 516, motorized wheel 518, motorized wheel 520, motorized wheel 522, motorized wheel 524, and motorized wheel 526. These motorized wheels are configured to move inspection unit 110 within interior 120 of stringer 122.

Figure 6:
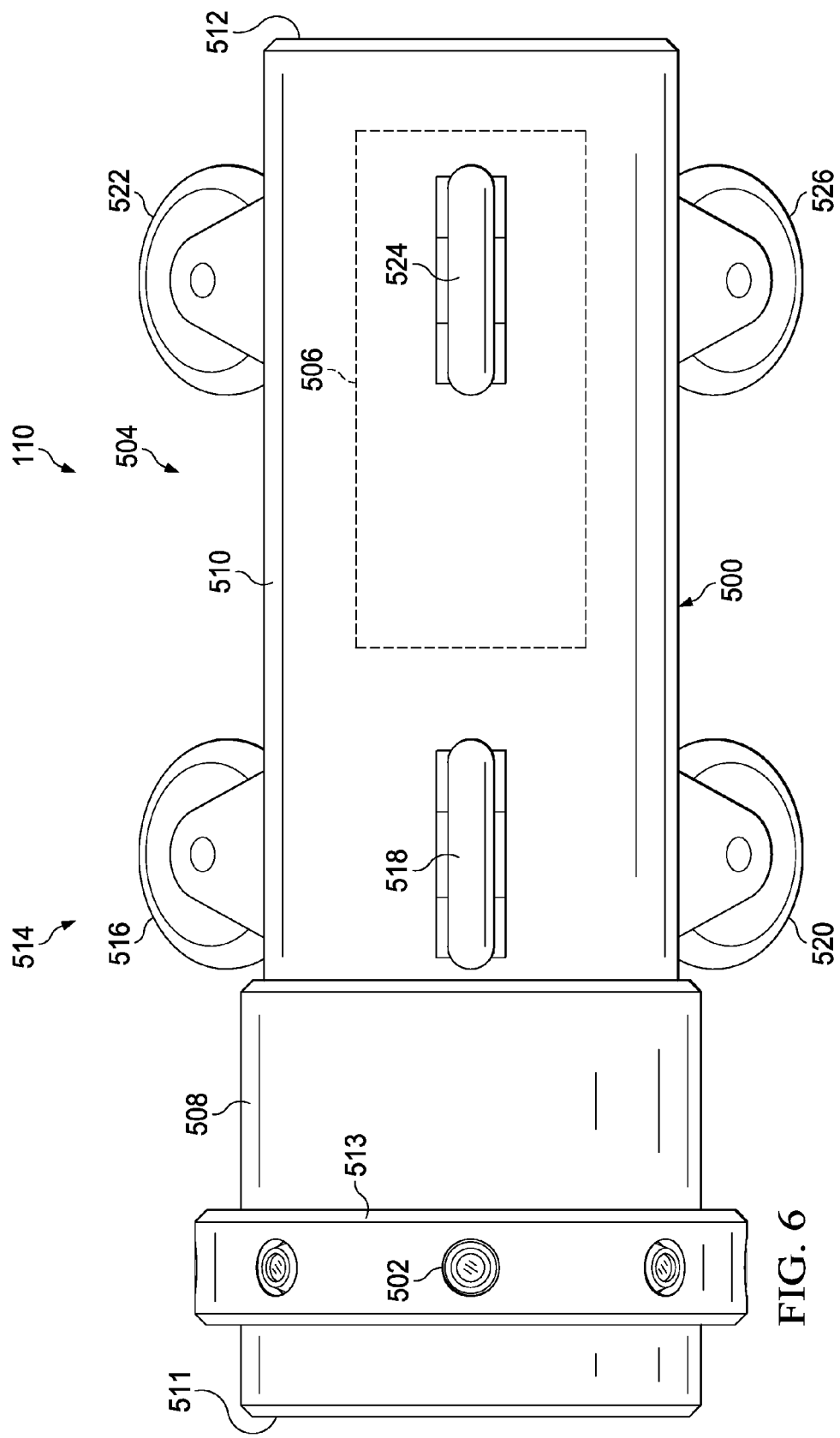
FIG. 6 is an illustration of a side view of an inspection unit in accordance with an illustrative embodiment.

Turning now to FIG. 6, an illustration of a side view of an inspection unit is depicted in accordance with an illustrative embodiment.

Figure 7:
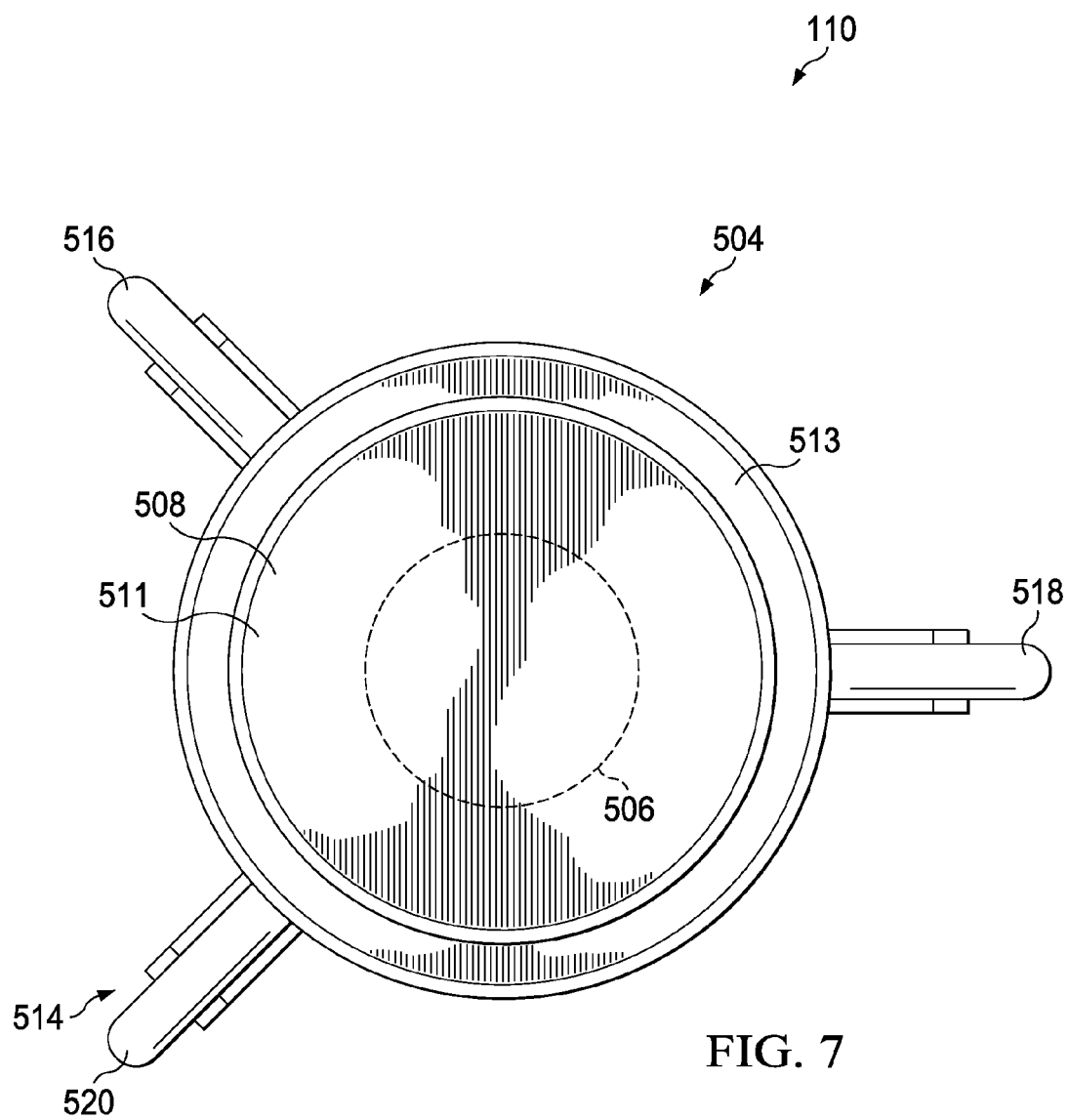
FIG. 7 is an illustration of a front view of an inspection unit in accordance with an illustrative embodiment.

In FIG. 7, an illustration of a front view of an inspection unit is depicted in accordance with an illustrative embodiment. In this illustrative example, end 511 of inspection unit 110 is shown.

Figure 8:
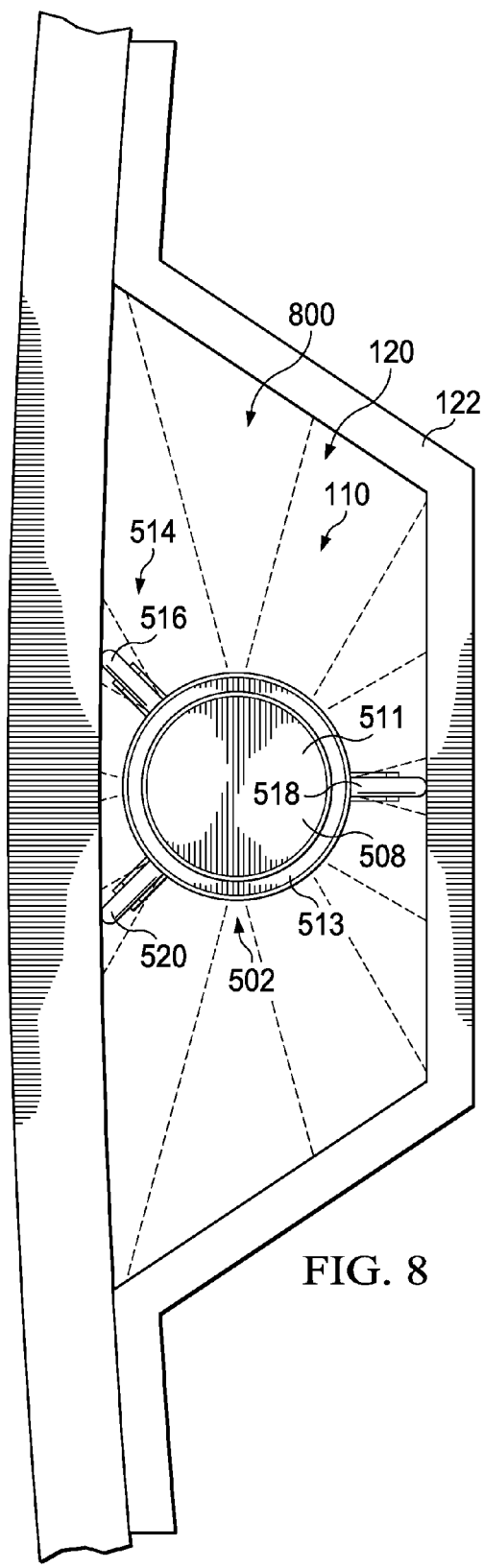
FIG. 8 is an illustration of a more detailed view of an inspection unit within an interior of a stringer in accordance with an illustrative embodiment.

Turning now to FIG. 8, an illustration of a more detailed view of an inspection unit within an interior of a stringer is depicted in accordance with an illustrative embodiment. In this illustrative example, a more detailed view of section 119 in FIG. 1 is shown.

As depicted, inspection unit 110 is shown moving into interior 120 of stringer 122. In this illustrative example, motorized wheel 516 moves inspection unit 110.

As can be seen in this view, array of lasers 502 generates beams of coherent light 800. In particular, camera system 506 (not shown) in inspection unit 110 may generate images while located within interior 120 of stringer 122.

Figure 9:
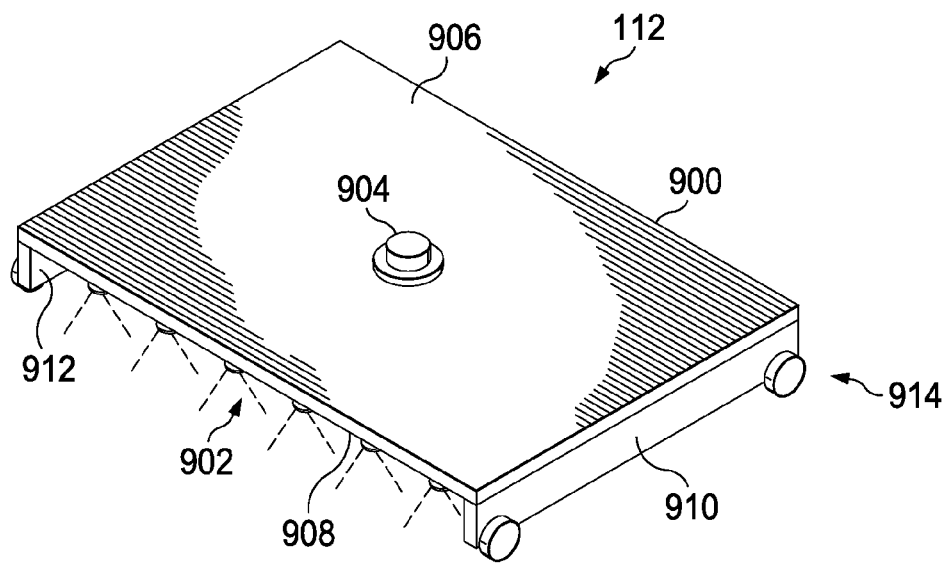
FIG. 9 is an illustration of an inspection unit in accordance with an illustrative embodiment.

Turning now to FIG. 9, an illustration of an inspection unit is depicted in accordance with an illustrative embodiment. In this depicted example, a perspective view of inspection unit 112 is shown. In this view, inspection unit 112 includes support structure 900, array of lasers 902, and camera system 904.

As depicted, support structure 900 has first side 906 and second side 908. Additionally, support structure 900 has flange 910 and flange 912. Wheels 914 are connected to flange 910 and flange 912. In this illustrative example, wheels 914 are not motorized wheels. Movement of support structure 900 is provided by a separate positioning system such as robotic arm 126 in FIG. 1.

In this illustrative example, array of lasers 902 may be implemented using nanolasers. With array of lasers 902, a shorter offset may be present as compared to using a single laser to cover the same area in these illustrative examples. As a result, inspection unit 112 may be placed closer to an object, such as wing 108, to provide more accurate results for testing using shearographic inspection system 104 in FIG. 1.

Figure 10:
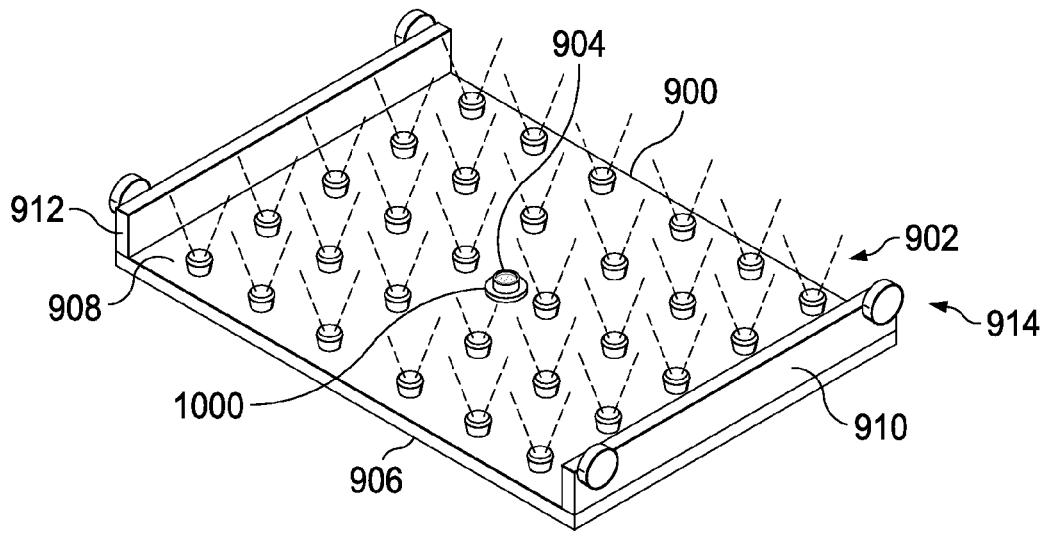
FIG. 10 is an illustration of another view of an inspection unit in accordance with an illustrative embodiment.

Turning now to FIG. 10, an illustration of another view of an inspection unit is depicted in accordance with an illustrative embodiment. Another perspective view of inspection unit 112 is shown in this figure. On second side 908, a better view of array of lasers 902 is shown. Array of lasers 902 is associated with second side 908 of support structure 900. As can be seen in this view, array of lasers 902 are arranged in a matrix. As depicted, camera system 904 is positioned to generate images through optics 1000 located on second side 908 of support structure 900.

Figure 11:
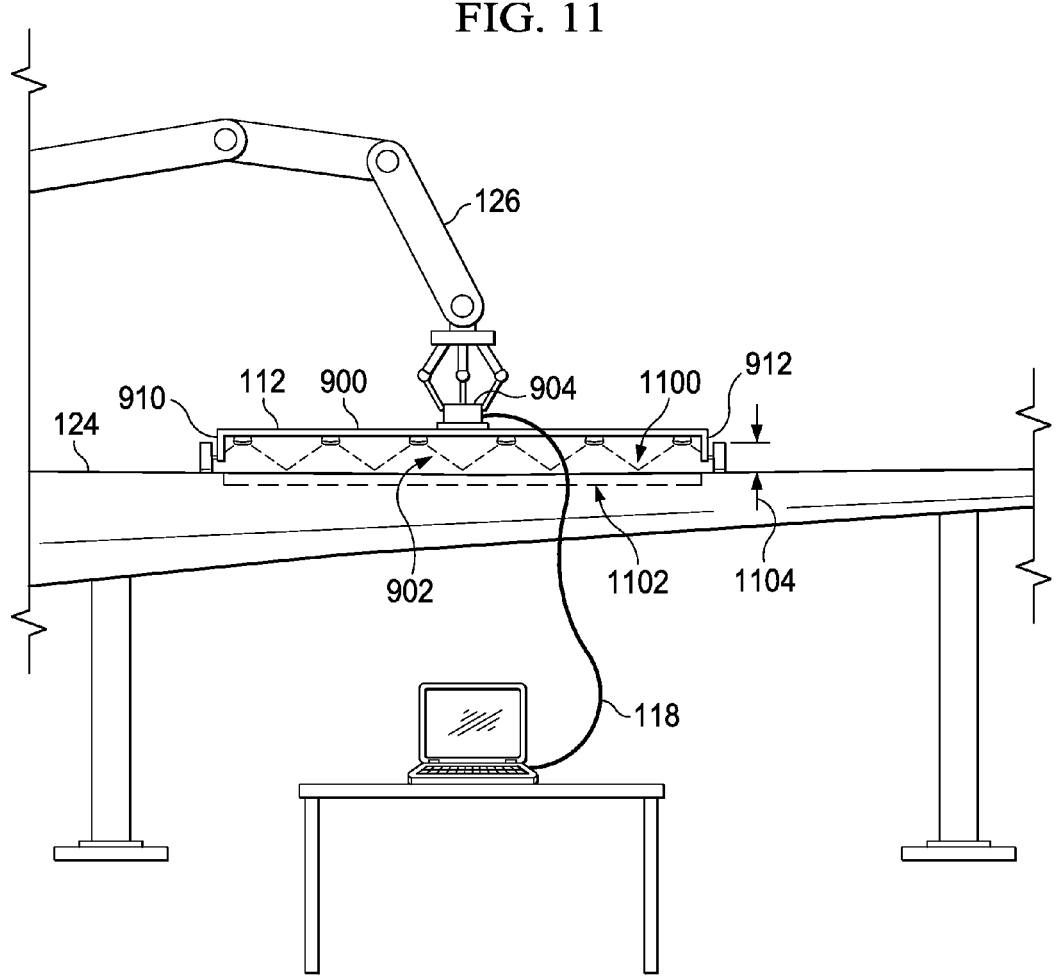
FIG. 11 is an illustration of a more detailed view of an inspection unit on a wing in accordance with an illustrative embodiment.

Turning now to FIG. 11, an illustration of a more detailed view of an inspection unit on a wing is depicted in accordance with an illustrative embodiment. In this illustrative example, a more detailed illustration of inspection unit 112 on surface 124 of wing 108 in section 125 is shown.

In this view, array of lasers 902 generates beams of coherent light 1100. The coherent light in beams of coherent light 1100 may have a substantially uniform distribution on surface 124 of wing 108. This distribution is within area 1102. This distribution within area 1102 may be provided with offset 1104. Offset 1104 is shorter as compared to using a single laser in a currently available shearographic inspection system.

The illustration of inspection unit 110 and inspection unit 112 in FIGS. 5-11 are not meant to imply physical or architectural limitations to the manner in which different inspection units may be implemented. For example, inspection unit 110 may be an elongate member with a cross-sectional shape of a triangle, a pentagon, a square, or some other shape other than a cylinder as depicted in the different examples. Further, one or more additional rings of lasers may be connected to cylinder 510 in addition to array of lasers 502 on ring 513.

In still other illustrative examples, inspection unit 110 may have several different sizes. These sizes may be adjustable based on the size of the interior that is being inspected. For example, cylinder 510 may come in several sizes that may be used with inspection unit 110, depending on the particular implementation.

Figure 12:
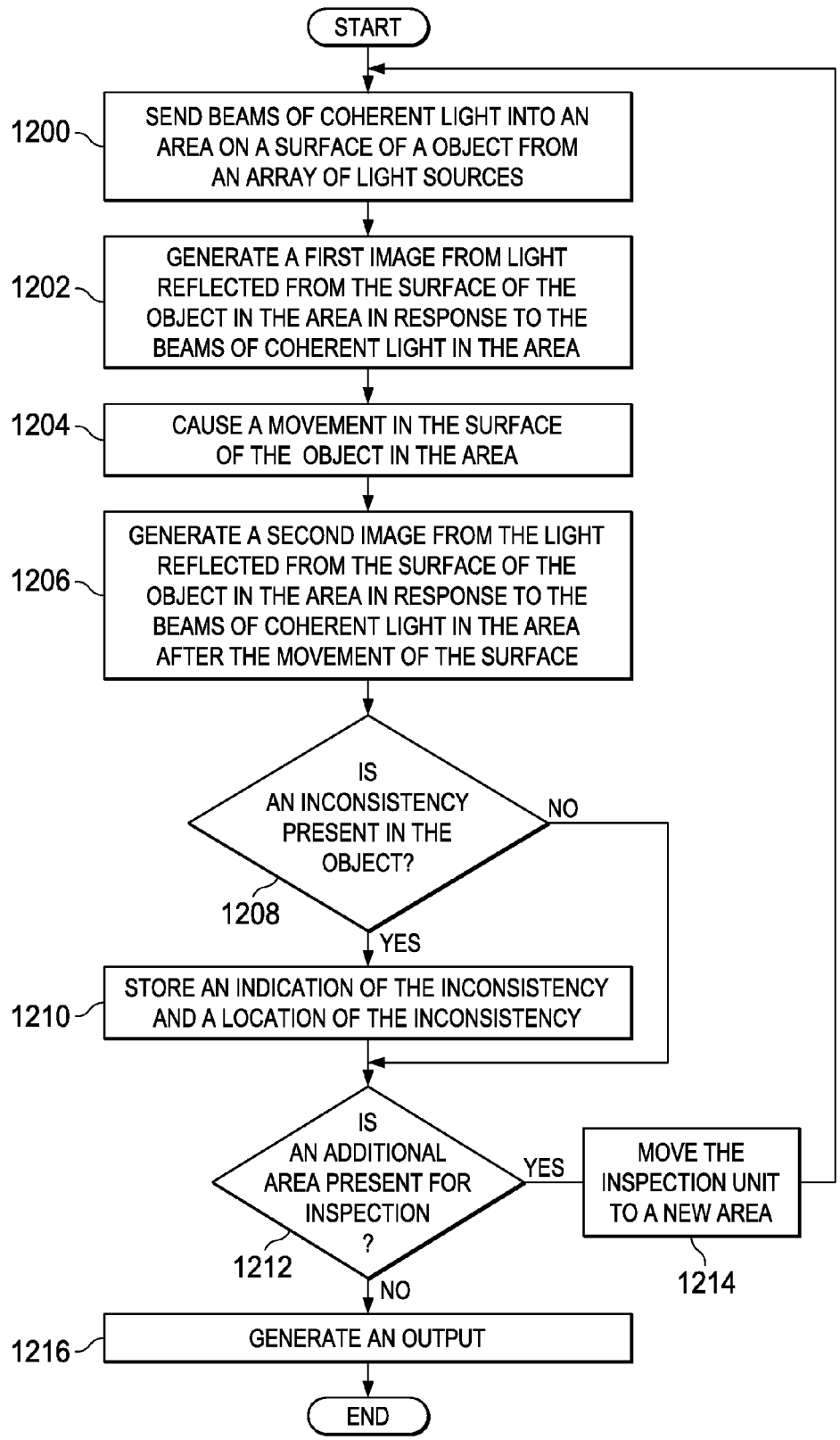
FIG. 12 is an illustration of a flowchart of a process for inspecting an object in accordance with an illustrative embodiment.

With reference now to FIG. 12, an illustration of a flowchart of a process for inspecting an object is depicted in accordance with an illustrative embodiment. The process illustrated in FIG. 12 may be implemented in inspection environment 100 in FIG. 1 or inspection environment 200 in FIG. 2. In particular, the operations illustrated in FIG. 12 may be implemented using shearographic inspection system 104 in FIG. 1 or shearographic inspection system 204 in FIG. 2.

The process begins by sending beams of coherent light into an area on a surface of an object from an array of light sources (operation 1200). The beams of coherent light are synchronized and have a substantially uniform distribution in the area on the surface of the object. The process then generates a first image from light reflected from the surface of the object in the area in response to the beams of coherent light in the area (operation 1202). This first image may be used as a reference image. In these illustrative examples, a number of speckle patterns are present in the images.

A movement is then caused in the surface of the object in the area (operation 1204). A second image is then generated from the light reflected from the surface of the object in the area in response to the beams of coherent light in the area after the movement of the surface (operation 1206).

The process then determines whether an inconsistency is present in the object using the first image and the second image (operation 1208). A comparison of the images may be used to determine whether an inconsistency is present in the object. This comparison may result in a difference between a first speckle pattern in the first image and a second speckle pattern in the second image. This difference shows that an inconsistency is present in the object.

An inconsistency may be present when the speckle pattern between the first image and the second image are different. For example, a void, a delamination, a change in porosity, or some other type of inconsistency under the surface of the composite structure may result in a change in the surface of the object that is identifiable from the speckle pattern in the first image taken prior to the movement of the surface of the composite structure.

If an inconsistency is present, an indication of the inconsistency and a location of the inconsistency is stored (operation 1210). A determination is then made as to whether an additional area is present for inspection (operation 1212). If an additional area is present for inspection, the inspection unit is moved to a new area (operation 1214), with the process then returning to operation 1200 as described herein.

Otherwise, an output is generated based on the determination (operation 1216), with the process terminating thereafter. With reference again to operation 1208, if an inconsistency is not present, the process then proceeds to operation 1212 as described herein.

Figure 13:
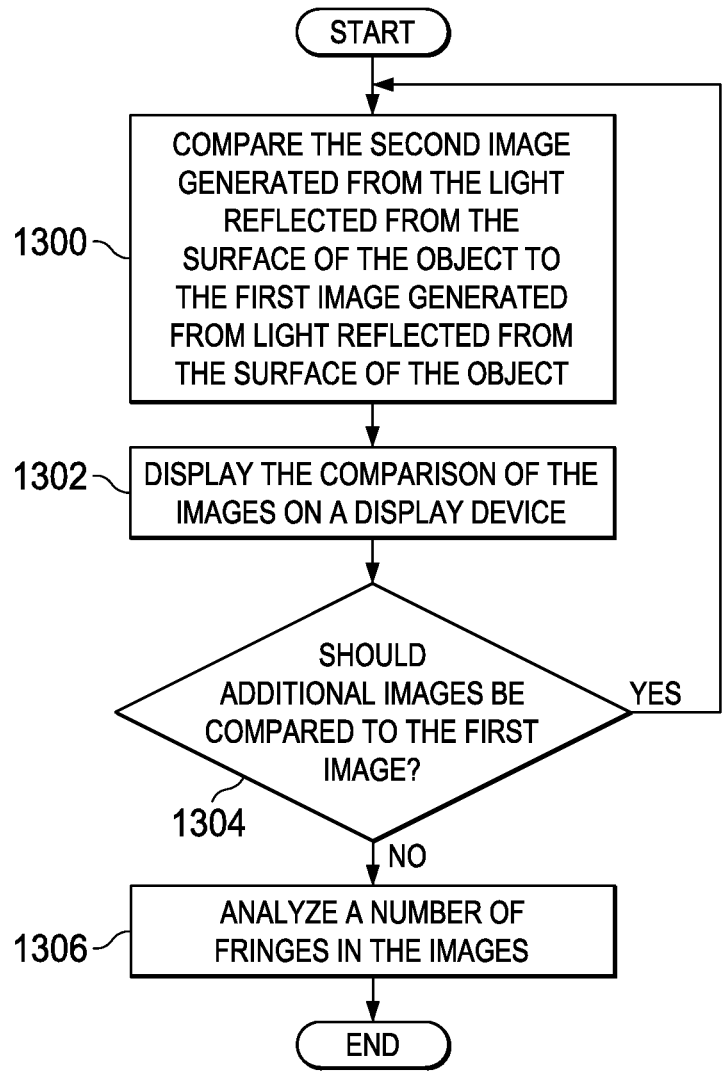
FIG. 13 is an illustration of a flowchart of a process for determining whether an inconsistency is present in an object in accordance with an illustrative embodiment.

With reference now to FIG. 13, an illustration of a flowchart of a process for determining whether an inconsistency is present in an object is depicted in accordance with an illustrative embodiment. The process illustrated in FIG. 12 may be implemented in inspection environment 100 in FIG. 1 or inspection environment 200 in FIG. 2.

In particular, the operations illustrated in FIG. 12 may be implemented using shearographic inspection system 104 in FIG. 1 or shearographic inspection system 204 in FIG. 2. Moreover, this process may be implemented in operation 1208 in FIG. 12 to determine whether an inconsistency is present within the object.

The process begins by comparing the second image generated from the light reflected from the surface of the object to the first image generated from light reflected from the surface of the object (operation 1300). The first image may be known as a reference image in these illustrative examples. This comparison may be a subtraction of the second image from the first image.

Next, the process displays the comparison of the images on a display device (operation 1302). The display device may display the comparison of the images such that individual comparisons with the first image may be seen on the display device. In other illustrative examples, all of the images may be taken by the camera system and then displayed on the display device at one time.

A determination is then made as to whether additional images should be compared to the first image (operation 1304). If additional images are in need of comparison, the process returns to operation 1300 as described herein. The process repeats itself for each subsequent image taken by the camera system.

With reference again to operation 1304, if additional images are not in need of comparison to the first image, the process analyzes a number of fringes in the images (operation 1306), with the process terminating thereafter. In operation 1306, an analyzer, such as analyzer 208 in FIG. 2, may count the number of fringes in the images displayed on the display device. These fringes represent the amount of out of plane displacement in the surface of the object.

For example, as more fringes that are present in the images, a greater the out of plane displacement of the surface of the object is present. In other words, as the number of fringes in the images increases, the deformation in the surface of the object also increases. In this manner, analyzer 208 in shearographic inspection system 204 may determine the presence of inconsistency 242 by determining the out of plane displacement of surface 224 of object 202 with inconsistency 242.

In particular, the fringes displayed in the images of surface 224 of object 202 may represent a strain on object 202. The out of plane displacement determined by the number of fringes may be used to determine the mechanical strain on object 202 in these illustrative examples.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
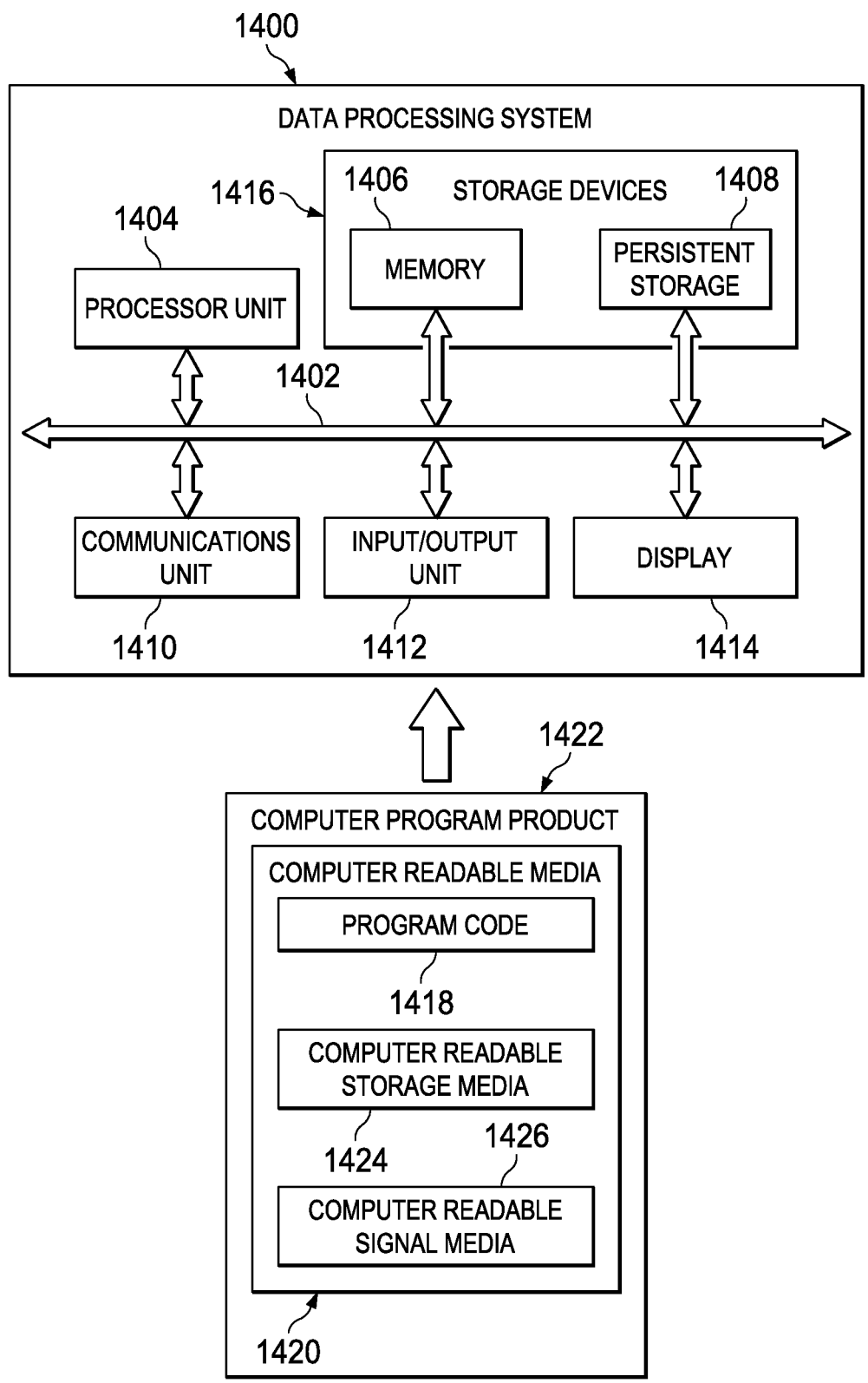
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer 114 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Figure 15:
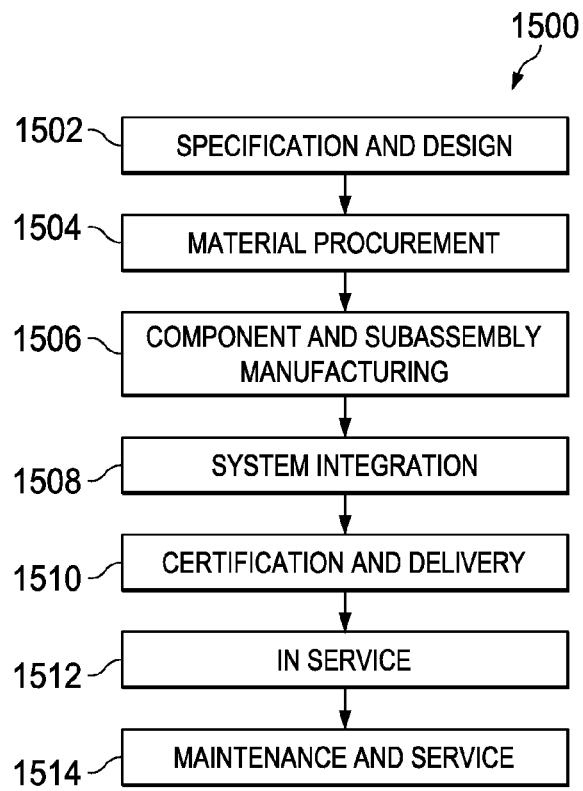
FIG. 15 is an illustration of an aircraft manufacturing and service method in accordance with an illustrative embodiment.
Figure 16:
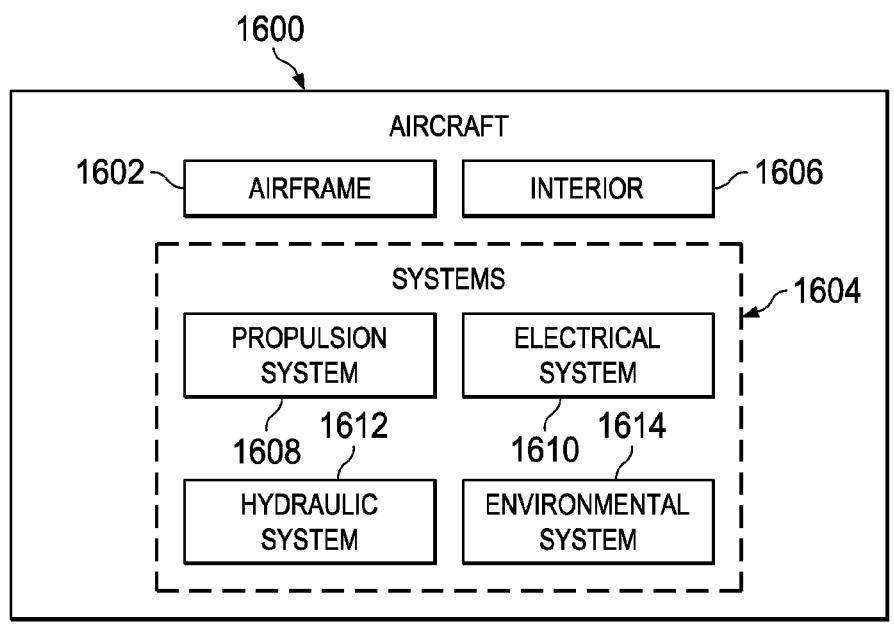
FIG. 16 is an illustration of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Specifically, shearographic inspection system 104 in FIG. 1 or shearographic inspection system 204 in FIG. 2 may be implemented during aircraft manufacturing and service method 1500.

Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. For example, one or more illustrative embodiments may be employed to perform inspection of aircraft 1600 or components for aircraft 1600 during different stages of aircraft manufacturing and service method 1500.

For example, shearographic inspection system 204 may be used to inspect components for aircraft 1600 manufactured during component and subassembly manufacturing 1506. These components may include composite components as well as other types of components. These other types of materials may be, for example, without limitation, fasteners, sealant, aluminum, aluminum honeycomb structures, metal sandwich structures, fiberglass bonded structures, rubber coated structures, thermal protection coated structures, aircraft tires, or other suitable structures.

Additionally, shearographic inspection system 204 may be used to perform inspections of different structures during and after system integration 1508 of aircraft 1600. Additionally, inspections may be performed while aircraft 1600 is in service 1512 or during maintenance and service 1514.

In one illustrative example, shearographic inspection system 204 may be used to perform inspections of composite structures on aircraft 1600 during maintenance, upgrades, repairs, and other operations that may occur during maintenance and service 1514. For example, shearographic inspection system 204 may be used to inspect patches that may be installed during reworking of composite structures, such as a fuselage, a wing, or other suitable composite structure.

Additionally, the use of shearographic inspection system 204 may substantially expedite the assembly of aircraft 1600, reduce the cost of aircraft 1600, or provide other benefits. For example, with shearographic inspection system 204, inspections of areas in aircraft 1600 that have limited access may be performed more easily as compared to currently available shearographic inspection systems.

Further, shearographic inspection system 204 may be used to perform inspections of stringers, fuel tanks, and other cavities or spaces that may have access that makes currently used shearographic inspection systems infeasible or more difficult to use than desired. For example, inspection using shearographic inspection system 204 may be performed without requiring disassembly of aircraft 1600 or reducing the amount of disassembly of aircraft 1600 as compared to currently used systems.

Thus, the illustrative embodiments provide a method and apparatus for inspecting an object. In one illustrative embodiment, an apparatus comprises an array of light sources and a support structure. The array of light sources is configured to generate beams of coherent light with a substantially uniform distribution of the beams of coherent light in an area on the surface of the object that results in a number of speckle patterns in light reflected from the surface of the object in the area in response to the beams of coherent light directed to the area. The support structure is associated with the array of light sources and provides a framework to hold the array of light sources.

With the use of an array of light sources, a desired area may be covered by the beams of coherent light with a substantially uniform distribution and a smaller offset than is possible with a single beam configured to illuminate the same area.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
a matrix of lasers, wherein the lasers of the matrix are arranged in rows and columns, the matrix including at least four lasers, the matrix being configured to generate beams of coherent light in an area on a surface of an object, and wherein a number of speckle patterns in light reflected from the surface of the object form in response to the beams of coherent light in the area;
a support structure for the matrix;
a camera system configured to generate images of the area, in which the number of speckle patterns are present in the images;
wherein the object is inspected via the apparatus;
wherein the support structure has a first side and a second side;
wherein the support structure has a first flange and a second flange;
wherein a plurality of wheels that are not motorized are connected to the first flange and the second flange;
wherein movement of support structure is provided by a robotic arm;
wherein the matrix of lasers is associated with the second side of the support structure; and
wherein the camera system is positioned to generate images through optics located on the second side of the support structure.

2. The apparatus of claim 1, further comprising:
an analyzer configured to compare the images to form a comparison and determine whether an inconsistency is present in the object based on the comparison.

3. The apparatus of claim 2, wherein the analyzer is configured to subtract a first image in the images from a second image in the images to compare the images to form the comparison.

4. The apparatus of claim 1, further comprising:
a movement generator configured to cause a movement of the surface of the object in the area, the movement being at least a quarter of a wavelength of the beams of coherent light.

5. The apparatus of claim 1, wherein the object is selected from one of a stringer and a fuel tank, and wherein the matrix and the support structure are configured for placement into the object.

6. The apparatus of claim 1, wherein the lasers comprise nanolasers.

7. The apparatus of claim 4, wherein the movement generator is selected from at least one of a biasing member, a heating element, a vacuum generator, and a laser.

8. The apparatus of claim 1, wherein the lasers are equally spaced.

9. An array of lasers, the array including at least four lasers, the array being configured to generate beams of coherent light in an area on a surface of an object, and wherein a number of speckle patterns in light reflected from the surface of the object form in response to the beams of coherent light in the area;
a support structure connected to the array;
a camera system configured to generate images of the area, in which the number of speckle patterns are present in the images;
wherein the camera system is located within the support structure;
wherein the support structure takes a form of an elongate member in a form of a cylinder and has a cross section that is a circular shape;
wherein the cylinder has a first end and a second end;
wherein a shape and dimensions of the support structure are configured for placement of the support structure into an interior of a stringer;
wherein the array of lasers are located on a ring which is connected to the cylinder;
wherein the array of lasers is implemented using nanolasers;
wherein optics provide the camera system with an ability to generate images from light generated by the array of lasers;
wherein the optics comprises one or more of a lens and a mirror;
wherein the optics are shearing optics configured to allow for the generation of the images for out of plane displacement of the object;
wherein the out of plane displacement is identified as rise over run, or slope;
wherein if an inconsistency is present in the object, out of plane displacement is present and is used to determine a mechanical strain on the object; and
one or more motorized wheels configured to move the support structure within the interior of the stringer.

10. The array of lasers of claim 9, further comprising:
an analyzer configured to compare the images to form a comparison and determine whether an inconsistency is present in the object based on the comparison.

11. The array of lasers of claim 9, wherein the one or more motorized wheels compose a movement generator configured to cause a movement of the surface of the object in the area, the movement being at least a quarter of a wavelength of the beams of coherent light.

12. The array of lasers of claim 9, wherein the lasers are equally spaced.

13. The apparatus of claim 1, wherein the lasers are equally spaced with respect to each other.

* * * * *